US008842606B2

(12) United States Patent
Denteneer et al.

(10) Patent No.: US 8,842,606 B2
(45) Date of Patent: Sep. 23, 2014

(54) ENHANCED MULTI-USER TRANSMISSION

(75) Inventors: Theodorus Jacobus Johannes Denteneer, Eindhoven (NL); Hans Juergen Reumerman, Eindhoven (NL); Jelena Mirkovic, Aachen (DE); Bernard Walke, Wuerselen (DE); Michael Einhaus, Aachen (DE); Semih Serbetli, Eindhoven (NL); Sri Andari Husen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 305 days.

(21) Appl. No.: 12/674,186

(22) PCT Filed: Aug. 26, 2008

(86) PCT No.: PCT/IB2008/053424
§ 371 (c)(1),
(2), (4) Date: Mar. 7, 2011

(87) PCT Pub. No.: WO2009/027931
PCT Pub. Date: Mar. 5, 2009

(65) Prior Publication Data
US 2011/0150004 A1 Jun. 23, 2011

(30) Foreign Application Priority Data
Aug. 31, 2007 (EP) .................................. 07115413

(51) Int. Cl.
*H04W 4/00* (2009.01)
*H04B 7/04* (2006.01)
(Continued)

(52) U.S. Cl.
CPC ............. *H04B 7/0452* (2013.01); *H04W 28/06* (2013.01); *H04W 72/1205* (2013.01); *H04W 76/02* (2013.01); *H04L 1/0026* (2013.01); *H04W 84/12* (2013.01); *H04L 25/0224* (2013.01); *H04L 5/0046* (2013.01); *H04B 17/0067* (2013.01); *H04B 17/0042* (2013.01); *H04L 5/0023* (2013.01); *H04L 5/0094* (2013.01); *H04W 8/26* (2013.01); *H04L 5/0053* (2013.01); *H04L 25/0204* (2013.01)
USPC ............................................ 370/328; 370/334

(58) Field of Classification Search
CPC ........... H04B 17/0042; H04B 17/0067; H04L 5/0053; H04L 25/0204
USPC .................... 370/203, 208, 310.2, 328, 334
See application file for complete search history.

(56) References Cited

U.S. PATENT DOCUMENTS 6,904,283 B2   6/2005  Li et al.
7,894,411 B2 *  2/2011  Adachi et al. ................. 370/338
(Continued)

FOREIGN PATENT DOCUMENTS

EP    1594259 A1    11/2005
WO    2004040827 A2    5/2004
(Continued)

OTHER PUBLICATIONS

Gross et al: "802.11 DYN: Protocol Extension for the Application of Dynamic OFDM(A) Schemes in 802.11 a/g Systems"; TKN Technical Report TKN-07-002, Technical University, Berlin, Retrieved From the Internet:URL:http://www.tkn.tu-berlin.de/publications//reports.jsp> [Retrieved on Feb. 19, 2009].

(Continued)

*Primary Examiner* — Xavier Szewai Wong
(74) *Attorney, Agent, or Firm* — Larry Liberchuk

(57) ABSTRACT

A transmitting and a receiving apparatus, a system and a method of performing multi-user transmission to other transmission ends include broadcasting a request for transmission to the other transmission ends. A request is provided with a Medium Access Control MAC frame which includes a list of at least two identifications of receiving ends which are requested to reply to the request.

24 Claims, 8 Drawing Sheets

| Frame Control | Duration | Receiver Address #1 | Receiver Address #2 | Receiver Address #3 | Transmitter Address | Proposed Tx Beamforming Vector for Receiver 1 | Proposed Tx Beamforming Vector for Receiver 2 | Proposed Tx Beamforming Vector for Receiver 3 | Frame Check Sequence |
|---|---|---|---|---|---|---|---|---|---|

(51) Int. Cl.
   *H04L 5/00*      (2006.01)
   *H04B 17/00*     (2006.01)
   *H04W 28/06*         (2009.01)
   *H04W 72/12*         (2009.01)
   *H04W 76/02*         (2009.01)
   *H04L 1/00*          (2006.01)
   *H04W 84/12*         (2009.01)
   *H04L 25/02*         (2006.01)
   *H04W 8/26*          (2009.01)

(56)  References Cited

U.S. PATENT DOCUMENTS

| | | | |
|---|---|---|---|
| 7,970,013 B2 * | 6/2011 | Sinha et al. | 370/470 |
| 2004/0184477 A1 * | 9/2004 | Tavli et al. | 370/461 |
| 2005/0105485 A1 * | 5/2005 | Cleveland | 370/320 |
| 2005/0220145 A1 * | 10/2005 | Nishibayashi et al. | 370/474 |
| 2005/0259686 A1 | 11/2005 | Lewis | |
| 2006/0071807 A1 | 4/2006 | Sadowsky | |
| 2006/0087998 A1 | 4/2006 | Saito et al. | |
| 2006/0209764 A1 | 9/2006 | Kim et al. | |
| 2006/0221873 A1 | 10/2006 | Sharony | |
| 2006/0270343 A1 | 11/2006 | Cha et al. | |
| 2007/0070927 A1 | 3/2007 | Shoki et al. | |
| 2007/0086540 A1 | 4/2007 | Chae et al. | |
| 2007/0171933 A1 * | 7/2007 | Sammour et al. | 370/447 |
| 2007/0206504 A1 * | 9/2007 | Koo et al. | 370/245 |
| 2007/0258384 A1 * | 11/2007 | Sammour et al. | 370/252 |
| 2009/0019150 A1 * | 1/2009 | Li et al. | 709/224 |
| 2009/0257393 A1 * | 10/2009 | Li et al. | 370/329 |
| 2012/0140845 A1 | 6/2012 | Kwak et al. | |

FOREIGN PATENT DOCUMENTS

| | | |
|---|---|---|
| WO | 2006055241 A2 | 5/2006 |
| WO | 2007032415 A1 | 3/2007 |
| WO | 2007040554 A2 | 4/2007 |
| WO | 2007040564 A1 | 4/2007 |

OTHER PUBLICATIONS

IEEE: "IEEE P802.11n/D2.0 Draft Standard for Information Technology—Telecommunications and Information Exhange Between Systems—Local and Metropolitan Area Networks—Specific Requirements" [Online], Feb. 2007, pp. 81-158.

Maaroufi et al: "Performance Evaluation of New Mac Mechanisms for IEEE 802.11n"; Global Infomation Infrastructure Symposium, Jul. 2007, pp. 39-45.

Mirkovic et al: "A Mac Protocol for MIMO Based IEEE 802.11 Wireless Local Area Networks"; IEEE Wireless Communications and Networking Conference, 2007 Proceedings, pp. 2133-2138.

Benveniste et al: "Performance Evalutation of a Medium Access Control Protocol for IEEE 802.11s Mesh Networks"; Avaya Labs Research, July 2005, 5 Page Document.

Lott et al: "Point-To-Multipoint ARQ Protocol With Efficient Acknowledgement Transmission"; IEEE 53rd Vehicular Technology Conference, 2001, vol. 4, pp. 3064-3068.

* cited by examiner

| Frame Control | Duration | Receiver Address #1 | Receiver Address #2 | Receiver Address #3 | Transmitter Address | Frame Check Sequence |
|---|---|---|---|---|---|---|

FIG. 6

| Frame Control | Duration | Receiver Address #1 | Receiver Address #2 | Receiver Address #3 | Transmitter Address | Proposed Tx Beam-forming Vector for Receiver 1 | Proposed Tx Beam-forming Vector for Receiver 2 | Proposed Tx Beam-forming Vector for Receiver 3 | Frame Check Sequence |
|---|---|---|---|---|---|---|---|---|---|

FIG. 7

| Frame Control | Duration | Receiver Address | Confirmed Tx Beamforming Vector Bit for Spatial Stream 1 | Confirmed Tx Beamforming Vector Bit for Spatial Stream 2 | Frame Check Sequence |

FIG. 12

| Frame Control | Duration | RX Address #1 | RX Address #2 | RX Address #3 | TX Address | Frame Check Sequence |

FIG. 13

| Frame Control | Duration | TX Address | Proposed # of spatial streams | Frame Check Sequence |

| Frame Control | Duration | RX Address #1 | RX Address #2 | RX Address #3 | Proposed Tx Beamfor-ming Vector for TX 1 | Proposed Tx Beamfor-ming Vector for TX 2 | Proposed Tx Beamfor-ming Vector for TX 3 | Frame Check Sequence |
|---|---|---|---|---|---|---|---|---|

FIG. 14

| Frame Control | Duration | RX Address #1 | RX Address #2 | RX Address #3 | Acknowledged Packet Bitmap (APB) | Frame Check Sequence |
|---|---|---|---|---|---|---|

FIG. 15

ENHANCED MULTI-USER TRANSMISSION

FIELD OF THE INVENTION

The present invention generally relates to a transmitting apparatus, a receiving apparatus, a system and a method of performing multi-user transmission to a plurality of other transmission ends in a transmission systems such as—but not restricted to—a wireless local area network (WLAN).

BACKGROUND OF THE INVENTION

Wireless local area networks (WLANs) as defined e.g. in the IEEE 802.11 specifications are almost omnipresent today. The increase of throughput of the available channel was one major issue, and research has been focused on improving the modulation and coding within the Physical Layer. By employing orthogonal frequency division multiplexing (OFDM) in combination with high-rate signal constellations, up to 54 Mbit/s could be achieved. This huge performance jump—even if achieved only for very limited distances—is caused by to inherent features of OFDM, which have become especially attractive for high bit-rate systems. In OFDM, the given system bandwidth is split into many sub-channels, also referred to as sub-carriers. Instead of transmitting symbols sequentially through one (very broad) channel, multiple symbols are transmitted in parallel. This leads to much longer symbol durations, such that the impact of inter-symbol interference can be reduced significantly, so that no additional measures like costly equalization are necessary.

The 802.11 standard makes it mandatory that all stations implement a distributed coordination function (DCF) which is a form of carrier sense multiple access with collision avoidance (CSMA/CA). CSMA/CA is a contention-based protocol making certain that all stations first sense the medium before transmitting. The main goal is to avoid having stations transmit at the same time, which results in collisions and corresponding retransmissions. If a station wanting to send a frame senses energy above a specific threshold on the medium (which could mean the transmission of another station), the station wanting access will wait until the medium is idle before transmitting the frame. The collision avoidance aspect of the protocol pertains to the use of acknowledgements that a receiving station sends to the sending station to verify error-free reception. Although somewhat more complex, this process of accessing the medium can be seen as a meeting where everyone is polite and each person only speaks when no one else is talking. In addition, participants who understand what the person is saying nod their head in agreement.

Because of its nature, DCF supports the transmission of asynchronous signals. A distinguishing factor of asynchronous signaling is that there are no timing requirements between data carrying frames. For example, the DCF protocol doesn't make any attempt to deliver a series of data frames within any timeframe or at any instant in time. As a result, there is a random amount of delay between each data frame transmission. This form of synchronization is effective for network applications, such as e-mail, Web browsing and VPN access to corporate applications.

A potential for further bit-rate increases is seen in a use of multiple-input multiple-output (MIMO) antenna systems. Hence, a new Medium Access Control (MAC) protocol mechanism has been proposed, which supports multi-user (MU) MIMO transmissions in WLANs according to IEEE 802.11 based standards. The proposed new protocol extends the DCF with single-user (SU) MIMO in such a way that different stations can be destination stations for packets inside a MIMO frame (which is a set of packets transmitted simultaneously on different spatial streams).

According to a randomly operating backoff procedure, a station with a data packet to transmit generates a random number between 0 and a contention window (CW) size, which determines the duration of the backoff timer as counted in number of timeslots. The CW has a minimum starting value of 15, doubles after a collision, can rise up to 1023, and is decremented after a successful transfer, indicated by an acknowledgement (ACK) frame. After detecting the medium free for the duration of DCF Inter-Frame Space (DIFS), the mobile station counts down the backoff timer until it reaches zero and then starts its transmission. If during the countdown another mobile station occupies the medium, all mobile stations in backoff interrupt their count down and defer until they detect the medium free for at least DIFS. The standard includes an optional Request-to-Send (RTS)—Clear-to-Send (CTS) handshake prior to the transmission.

In an association procedure prior to data transmissions, stations share among each other the information about their hardware capabilities. Information concerning used antenna elements can be exchanged using an extended form of RTS and CTS control frames, described in the following paragraphs.

The extended RTS frame—MIMO-RTS (M-RTS) and the extended CTS frame—MIMO-CTS (M-CTS) can be based on the structure of the IEEE 802.11a standard RTS and CTS frames. In order to support multiple antennas, both have a new field, e.g. a bitmap, where each bit stands for one antenna. A bitmap of a length of one byte can thus support up to eight antennas. Of course, the bitmap field can be longer or shorter depending on the number of antennas supported by the mobile stations of a given system. In the M-RTS frame this field may be called Proposed Antenna Bitmap (PAB) and may encode the chosen subset of available antennas proposed for the following transmission. The receiver of the frame confirms which antennas should be active in a Confirmed Antenna Bitmap (CAB) field of the M-CTS frame. The ACK frame is also extended to support per-stream acknowledgements. More specifically, the MIMO-ACK (M-ACK) frame may have a one byte long bitmap field called Acknowledged Packet Bitmap (APB) to confirm the reception of each packet from different streams separately. It contains positive and negative acknowledgements for each spatial stream. It can still be immediately acknowledging, although there are multiple packets being transmitted at a time. The length of the bitmaps (L) can be arbitrary.

The following points give an overview of the additional MAC protocol functionality of M-DCF during a transmission cycle, omitting the ones concerning CSMA/CA:

The transmitter sends an M-RTS frame, setting binary "1"s in the PAB field for available antennas for the next transmission.

Immediately afterwards, when the receivers have already read the M-RTS frame and available antennas, the transmitter sends a training sequence for each available antenna for channel estimation. Alternatively, channel estimation is done in parallel to M-RTS frame.

The receiver estimates the channel, and responds with an M-CTS frame, setting binary "1"s in the CAB field for the antennas which should be used for the transmission. The MIMO scheme can be selected based on at least one of the stations' hardware capabilities, quality of service (QoS) demands of the connection, radio propagation conditions, and current status of the network. How the receiver chooses the antennas can be its internal procedure. This procedure of choosing the applied MIMO scheme during network operation of per frame basis provides fast link adaptation.

After reception of the M-CTS frame, the transmitter transmits (one or more) packets based on the receiver's instructions about the antennas to be used, each using a separate antenna.

After the reception of the data frame(s), the receiver checks the correctness of the received packets, and may create an extended M-ACK frame to inform the transmitter about the outcome of the transmission. Binary "1"s are set in the M-ACK bitmap for the correctly received packets.

When the transmitter receives the M-ACK frame, it removes the packets from the queue and initiates another transmission. If the M-ACK frame is lost, or if it has never been transmitted at all, after a timeout the transmitter will retransmit the data.

An M_DCF protocol which is restricted to carrying a MAC packet in one spatial stream performs very well in networks of users with heavy load, because of its increased system capacity achieved by using MIMO technology. However, when the load is not high, the packet delay grows due to the fact that according to the protocol, a station does not start a transmission before having a number n of packets to transmit, where n is the number of spatial streams. If the mean inter-arrival time between two packets for a connection is T, maximum allowed delay should be higher then $(n-1)T$ plus the average transmission window length (including accessing the channel). Otherwise some packets will be discarded at the transmitter because of exceeded delay. This relation gives the lower bound for the offered load under which the delay requirement can still be fulfilled. Increasing the offered load (up to the point when the network capacity is reached) will improve the delay characteristic.

In ubiquitous networking, a station might be communicating with multiple other users at a time. Applying M-DCF directly would lead to high delays for each connection, although the station would actually have enough packets to build a MIMO frame. Therefore, combining the traffic belonging to multiple users should be enabled. This transmission strategy will immediately improve the delay characteristic, because the traffic received from all combined connections will contribute to the building of MIMO frames. In the previous lower bound calculation, the parameter T now corresponds to the inter-arrival time between any two packets, independent of the destination, and therefore the lower bound for the offered load of each individual connection is lower. Under heavy load, MU transmissions are means of reducing jitter. Moreover, Improving the delay characteristic is especially important for applications such as Voice-over-IP (VoIP), Video Conferencing, interactive gaming, etc.

J. Gross, et al., "802.11 DYN: Protocol Extension for the Application of Dynamic OFDM(A) Schemes in 802.11a/g Systems", Telecommunication Networks Group (TKN) Technical Report TKN-07-002 describes a proposal how the widely accepted IEEE 802.11a/g systems might be extended to support dynamic OFDM while assuring backward compatibility. A set of protocol modifications is presented, which support dynamic OFDM schemes both for point-to-point (e.g. uplink) and point-to-multi-point (e.g. downlink) transmission scenarios. The proposed RTS frame corresponds to the regular RTS frame (namely it contains only one transmit address and one receive address) with a new Physical Layer Convergence Protocol (PLCP) header to which a list of multiple receiver addresses is added.

However, legacy devices according to older or former standards in the network won't be able to decode the signal. Namely, the legacy devices may not be able to determine or extract the correct bits out of the signal. This means that the legacy devices wouldn't learn about the duration of the intended transmission because this information is contained in the RTS frame. Therefore, the proposed RTS transmission cannot be regarded as a broadcast transmission, because it cannot be understood (on the physical layer) by all stations. For this reason, the above prior art suggests transmitting, prior to RTS transmission, a CTS addressed to itself in the legacy physical layer, so that other legacy devices can decode the transmission and the MAC frame and set their network allocation vectors (NAV) for their transmission timing appropriately.

Additionally, in the above prior art, identification of the polled stations may be based on a 4-bit identification, for example. Yet, the identification is used for MAC purposes, namely, a CTS frame must be constructed and transmitted. This means, after receiving the RTS frame, the PHY layer extracts the identification list, and the MAC layer must then check whether the list contains an identification for itself, decode the frame, possibly overwrite the receiver address (which is the address of one of the addressees), then construct the CTS frame, and then take turn in sending the RTS. This requires substantial modifications of the standard RTS/CTS procedure and has significant impact on the architecture of the receiver, e.g., new information passing between PHY and MAC must be defined. Furthermore, some specific conditions must be applied in the interpretation and processing of the RTS frame.

As the above prior art also requires an assignment of this 4-bit identifications to the stations. This may be done during the association by the access point (AP) and may imply that an AP can only be associated with 16 stations having this MU-OFDM capability at one particular time.

SUMMARY OF THE INVENTION

It is an object of the present invention to provide a more flexible multi-user transmission scheme which requires less modifications of legacy devices and procedures.

Accordingly, an enhanced MAC frame, i.e., the MU-RTS, is defined. This frame is different from the ordinary RTS frame because it has multiple recipient MAC addresses. This enables an improved way of communicating the list of identifications or addresses to the other transmission ends. Although the proposed enhanced MAC frame has specific fields which are only meaningful/understandable to MU devices, the frame can be transmitted in the legacy physical layer and has common fields, that are understandable by all legacy devices. Therefore, legacy devices can decode the bits, interpret common fields and initiate appropriate settings. The interpretation of the enhanced MAC frame may be a pure MAC process, so that no further information is required from the physical layer. Moreover, there is no need to change interpretation rules for corresponding existing or legacy MAC frames. In view of the fact that all other transmission ends can be at least partially interpreted by all other transmission ends, its transmission can be regarded as a broadcast transmission from the physical layer perspective. Consequently, legacy devices and procedures require little modifications.

The proposed transmitting apparatus may be adapted to create a transmission frame only from packets destined to at least one of those other transmission ends which replied to the request for transmission. The receiving apparatus may be adapted to derive a timing for its response based on an order of its identification in the list. Thereby, different other transmission ends (e.g. WLAN stations) can be destinations for packets inside the frame, so that delay and throughput can be balanced in heterogeneous traffic situations.

The identification may for example comprise a MAC address, so that much longer addresses can be used as compared to physical layer addresses used in the initially described prior art.

In a specific embodiment, the other transmission ends may be candidate transmitters which are addressed to return a sending request to show their intention to transmit. The proposed apparatus may then be adapted to perform channel estimation for the candidate transmitters according to their channel realizations, and to reply to the sending request with a sending confirmation indicating which transmitter can access a channel by which beamforming vector or other corresponding channel access information. This provides the advantage that simultaneous multi packet reception from different transmitters can be supported and interference among spatial streams can be minimized.

In another embodiment, the transmitting apparatus may be configured to use the request for transmission as a request for feeding back a channel state information, to assess channel realizations of said other transmission ends based on channel state feedback information received from said other transmission ends, and to derive appropriate beamforming vectors for said other transmission ends, or subcarrier allocations in the MU-OFDM case. The receiving apparatus may be adapted to respond to the request for transmission with a channel feedback frame including a channel state information, and optionally also a duration information indicating an amount of data in its transmission queue. The transmitting apparatus may then be adapted to broadcast sending request frames including a list of other transmission ends and the appropriate beamforming vectors for the other transmission ends. The request for transmission may comprise information which specifies a format to be used for the requested channel state feedback information. Receipt of transmissions could be acknowledged by the transmitting apparatus by sending a MAC frame which indicates those other transmission ends from which said transmissions have been received. As an example, the other transmission ends (i.e. the receiving apparatus) from which the transmissions have been received, can be indicated by setting a respective bit in a bitmap provided in the MAC frame.

Thus, an enhanced MU-DCF can be provided, which is based on two phases. First, the channel state information is obtained from candidate stations. Second, signaling exchange for channel access is performed. This provides a better coordination of the multi-user transmission and a reduction of possible interference.

In a further embodiment, the transmitting apparatus may be adapted to add to the request for transmission a duration information which indicates a predicted duration of the whole expected transmission. This measure provides a solution to the hidden problem, as all receiving ends are enabled to calculate the duration they must wait before starting their transmission. More specifically, the receiving apparatus can be adapted to set its network allocation vector in accordance with a content of a duration field provided in the request for transmission, if the list does not contain any identification of said apparatus. Other receiving apparatus polled by the list can be adapted to calculate a waiting time for their response based on the duration field.

In a still further embodiment, the receiving apparatus may be adapted to respond to the request for transmission by combining an aggregate MAC packet data unit and a single user sounding feedback mechanism. Thereby, the response can be constructed by combining a conventional response frame (e.g. a CTS frame) with a sounding feedback frame, so that legacy compliance can be improved and the current standard requires only little modification.

In another embodiment, the receiving apparatus may be adapted to use an assigned subset of sub-carriers of a multi-user transmission signal for the response. In a specific example, the assigned subset may be derived from an order of said identification in the list. This measure provides the advantage that the time needed to transmit feedback information (e.g. M-CTS and/or M-ACK frames) can be reduced, as it can be in parallel and not in a time divisional manner. Thereby, signaling overhead can be reduced and the hidden node problem prevented.

The transmitting or receiving apparatus may comprise any type of MU transceiver with at least one of multiple input chain and a multiple output chain. It is not intended to be restricted to a MU MIMO transceiver. The request for transmission can be transmitted in a legacy format, so that all devices, MU and legacy devices can set their NAV accordingly. Legacy devices may at least understand the duration field and therefore can set their NAV accordingly Further advantageous developments are defined in the dependent claims.

BRIEF DESCRIPTION OF THE DRAWINGS

The present invention will now be described based on various embodiments with reference to the accompanying drawings in which:

FIG. 6 shows an MU-CFR frame structure according to the second embodiment;

FIG. 7 shows an MU-RTS frame structure with Tx beamforming vectors according to the second embodiment;

FIG. 12 shows a C4T frame structure according to the fifth embodiment;

FIG. 13 shows an RTS frame structure according to the fifth embodiment;

FIG. 14 shows an MU-CTS frame structure with Tx beamforming vectors according to the fifth embodiment; and FIG. 15 shows an MU-ACK frame structure according to the fifth embodiment.

DETAILED DESCRIPTION OF EMBODIMENTS

Figure 1:
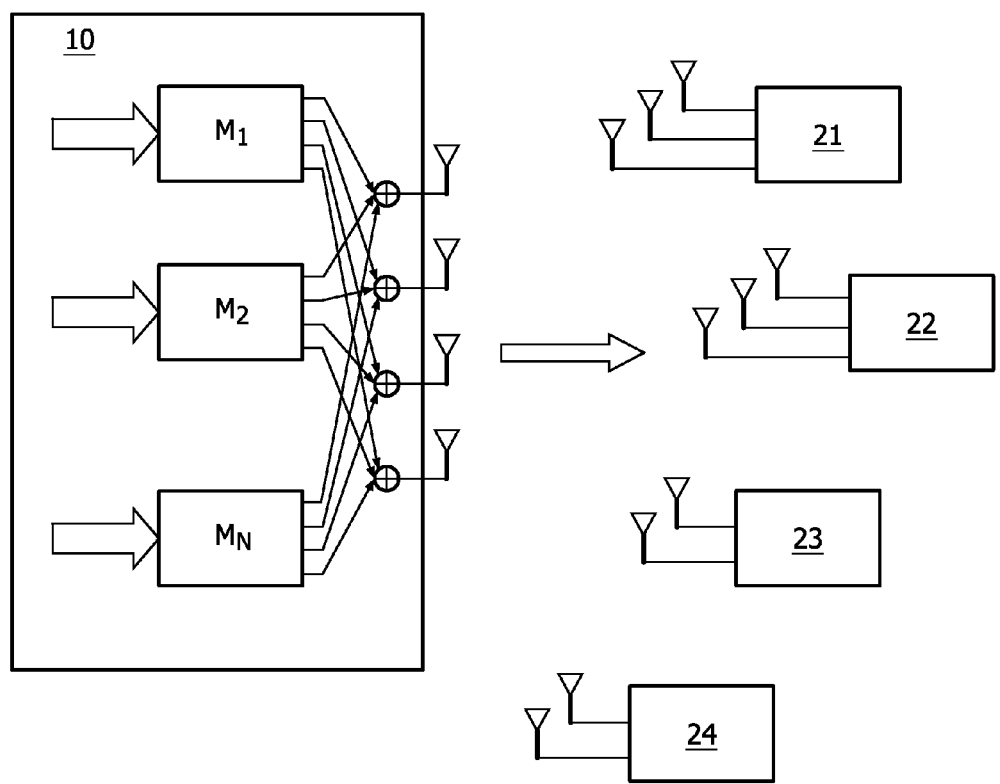
FIG. 1 shows a schematic block diagram of multi-user MIMO transmission system according to various embodiments.

In the following, preferred embodiments are described on the basis of a MU MIMO system as shown in FIG. 1.

According to FIG. 1, a MU MIMO access point (AP) 10 provides WLAN access for an exemplary number of four stations 21 to 24 shown in FIG. 1 and having multiple antennas. The AP 10 comprises N different processing stages $M_1$ to $M_N$ for providing different coding and/or modulating schemes, to which input signals can be applied and which can be selectively connected to at least one of a plurality antennas.

In general, two types of MIMO techniques can be used in both directions between the AP 10 and each of the stations 21 to 24 based on the propagation channel properties, i.e. the structure of the spatial correlation matrix at the receiver's antenna array. In case of high correlation of the received signal different beamforming algorithms can be applied, while in case of low correlation of the received signal—diversity (DIV) and multiplexing (MUX) approaches may give better performance. In MUX schemes, multiple streams are transmitted simultaneously, each using one dedicated antenna. This increases the throughput with a factor equal to the number of streams being transmitted. In DIV schemes, multiple antennas are used in a different way. For the basic DIV scheme the transmitter uses only one antenna. The receiver with multiple antennas receives multiple copies of the transmitted signal so that using an appropriate signal processing algorithm achieves significantly higher signal-to-noise ratios (SNRs). In the schemes combining MUX and DIV, more transmit antennas are active, but the receiver, as in all DIV schemes, may still have more antennas than the number of streams. Multiplexing is present, but the receiver gets more information about the transmitted signal than in the pure MUX case.

The following embodiments provide enhancements for multi-user support for IEEE 802.11 based networks by using MU-RTS and M-CTS frames for accessing the channel, and M-ACK for acknowledging the correctly received packets. Optionally, channel adaptive transmission can be selected by choosing only a subset of stations that replied with M-CTS to build the next MIMO frame. The decision can be made based on the information gained from M-CTS. In this way, MU diversity can be exploited. Furthermore, a channel quality information can be fed back using M-CTS and M-ACK frames, which indicates a subset of antennas acceptable for the transmission. Depending on the complexity and acceptable overhead, the encoded information can be more precise, such as received SNR from each antenna. Interframe spaces between neighbouring packets may be provided to ensure coexistence with legacy IEEE 802.11 stations.

Figure 2:
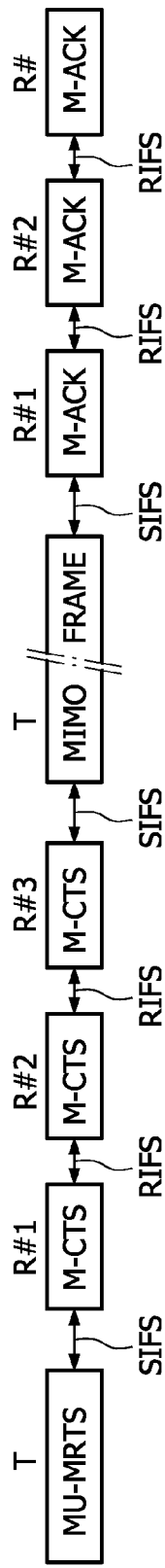
FIG. 2 shows a four-way handshake procedure according to a first embodiment.

FIG. 2 shows a four-way handshake procedure according to a first embodiment. The proposed MU-DCF is based on the conventional M-DCF, wherein the four-way handshake procedure is proposed to facilitate channel access with multiple users prior to data transmission.

The following additional MAC protocol functionalities are proposed during a transmission cycle in MU MIMO scenarios, compared to the conventional M-DCF protocol.

Figure 3:
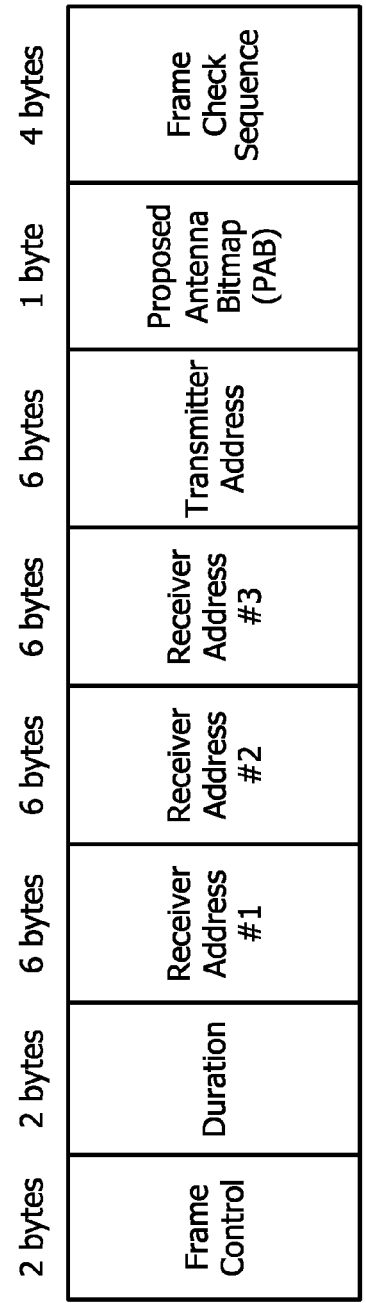
FIG. 3 shows an MU-RTS frame structure with multiple receiver address fields according to the first embodiment.

According to FIG. 2, the transmission is initiated e.g. by the AP 10 by broadcasting an MU-RTS frame as shown in FIG. 3 which is a MAC frame including multiple receiver addresses used for addressing e.g. three (R#1 to R#3) of the four exemplary stations 21 to 24 shown on FIG. 1. The MU-RTS frame can be followed by a training sequence for allowing channel estimation at the receiver side, e.g., at the selected ones of the stations 21 to 24. As an alternative option, channel estimation can also be done in parallel with the transmission of the MU-RTS frame, for example by transmission of preambles. It is noted that the transmission of preambles for channel estimations can result in the MU-RTS frame becoming undecodeable on the physical layer.

After receiving the MU-RTS frame, the selection of stations (R#1 to R#3) which are present in the receiver list reply with an M-CTS frame. The order of replies is implicitly determined by the respective receivers' order in the list. The first M-CTS is transmitted after a short interframe space (SIFS) interval, and the following ones are transmitted after reduced interframe space (RIFS) interval.

The above procedure can be programmed as a software routine based on the following pseudo code structure:

```
n is the position of the station in the receiver list in MU-RTS frame
after receiving MU-RTS, wait for SIFS
    while(the station still did not transmit its M-CTS)
        if (n=1)
            transmit M-CTS
        else
            if (the channel gets occupied){
                wait that the channel gets free
                n = n−1
                wait for RIFS
            }
            else{
                n = n−1
                wait for RIFS
            }
```

After it had transmitted MU-RTS frame, the transmitter (e.g. AP 10) starts sensing the channel, and may proceed after the following pseudo code structure (if implemented as software routine):

```
after SIFS, the first M-CTS is expected
while (waiting_for_more_M-CTS_frames)
    if an M-CTS did not arrive when expected,
        after RIFS the next M-CTS is expected;
    else
        after this transmission + RIFS the next M-CTS is expected;
```

The transmitter (e.g. AP 10) receives none, some, or all of the M-CTS frames from the addressed subset of stations. From the received ones, it may read the information provided in the CAB field (or any other channel state information that could be included in M-CTS frame), and may create a MIMO frame from those packets destined only to stations which replied. This can be expressed by the following pseudo code structure:

```
if (# of M-CTS received > 0)
    create and transmit a MIMO frame from the packets for stations that
    replied, optionally applying some scheduling strategy;
else
    start accessing the channel for the next transmission;
```

When applying a scheduling strategy, MIMO frames might not include packets from some of the stations that replied with an M-RTS frame. Scheduling may include adaptive switching between SU and MU operation mode.

The stations receive the MIMO frame, and generate a M-ACK frame, e.g., by the same rules as in M-DCF. The order and separation of M-ACK frames may be equal to the M-CTS frame.

Finally, when the transmitter (e.g. AP 10) receives the M-ACK frames, it removes the acknowledged packets from the queue and initiates another transmission. The unacknowledged packets may be retransmitted.

As can be gathered from FIG. 2, consecutive M-CTS and M-ACK frames are separated by RIFS. The number of multiple users m which is supported in this way can be determined by the following relation:

$$\text{SIFS} + (m-2)\text{RIFS} < \text{DIFS} \tag{1}$$

This condition ensures that even if all the M-CTS/M-ACK packets except the last one get lost, the last station will still have the channel free to transmit its own M-CTS/M-ACK packet. If the condition is not fulfilled, the channel could be free more then DIFS during an ongoing transmission, which would allow starting a new one.

Figure 4:
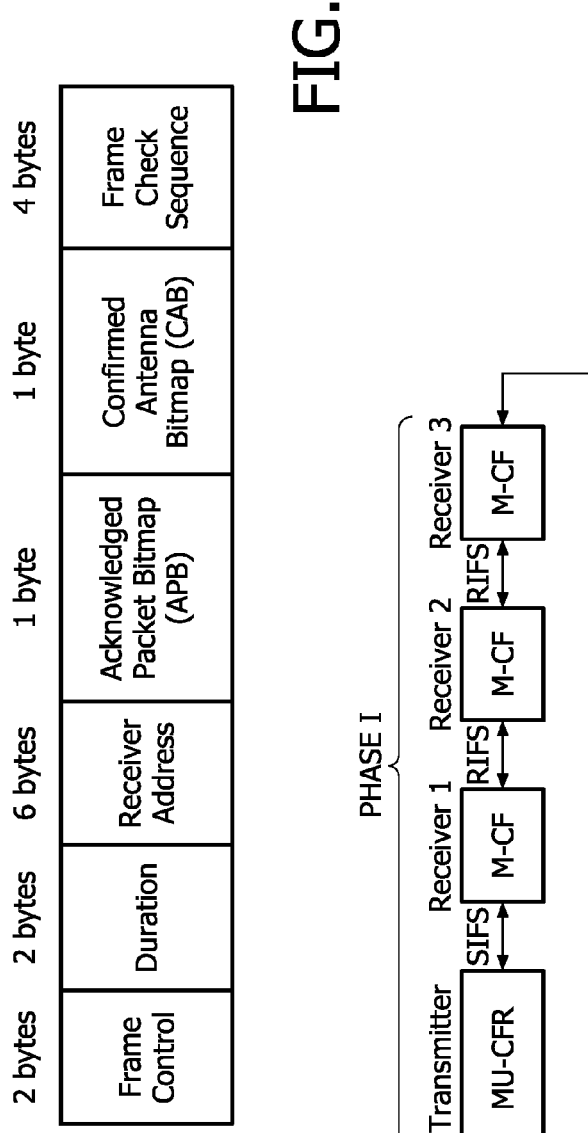
FIG. 4 shows an M-ACK frame structure with antenna usage instruction according to the first embodiment.

FIG. 4 shows an M-ACK frame structure according to the first embodiment with instructions for antenna usage for the next transmission. As already mentioned, M-CTS frames according to the M-DCF procedure contain a bitmap for antenna feedback (CAB field). This information can be used at the transmitter for adaptive channel usage, wherein only packets for stations with good channel state may contribute to the MIMO frame. By including the CAB field in the M-ACK frame as shown in FIG. 4, channel feedback can be obtained without requiring a M(U)-RTS—M-CTS handshake procedure.

Additionally, other options of IEEE 802.11e, such as transmission opportunities (TxOP), block acknowledgement (BA), or no acknowledgement may also be combined with the above procedures, so as to further improve the performance.

Furthermore, an overhead estimation could be performed. An induced overhead will now be illustrated based on the example of FIG. 1 with a single transmitter (AP 10) which transmits sixteen packets, four for each of the four stations 21 to 24. If all the stations 21 to 24 would have four antennas (which is not essential and just an example contrary to the example of FIG. 1), a 4×4 multiplexing scheme could be applied as follows:
SU Case:

$$4\times(\text{M-RTS+M-CTS+MIMO frame+M-ACK}) \tag{2}$$

MU Case:

$$4\times(\text{MU-RTS+4M-CTS packets+MIMO frame+4M-ACK}) \tag{3}$$

This indicates that the transmission procedure will clearly last longer in the below MU case, and the average delay per packet is the same in both cases. However, the average delay per station in the SU case differs much depending whether the station is the first or the last one to receive its packets. For some stations such long delays might not be acceptable.

So far, in the above example, it was assumed that at the beginning, all four packets for all four stations 21 to 24 were already generated. But there are many applications with a low offered load, but on the other hand with very strict delay requirements, which do not allow waiting too long for more packets for the current station to build the full MIMO frame. Otherwise, sending immediately what is present in the queue will often mean transmission of a single spatial stream, which effectively means multiplication of the overhead. If there is no restriction in the MAC packet to spatial stream mapping, a MAC packet may however as well be transmitted using multiple spatial streams.

In the case of heavy load, the proposed MU approach will be very beneficial, by reducing jitter.

Before the MU RTS/CTS handshake mentioned above in connection with the first embodiment, the transmitter (e.g. AP 10) may send an MU MIMO channel feedback request packet (MU-CFR) followed by training sequences that requests channel state information (CSI) feedback from the candidate receiver stations. The transmitter has thus a CSI of all candidate receivers and can assess all candidates for a possible MU MIMO transmission and select appropriate transmit beamforming vectors to reduce the interference among the spatial streams.

The MU RTS packet may be modified such that instead of communicating a proposed antenna bitmap, a proposed beamforming vector for each stream is communicated to the stations 21 to 24. This mechanism provides the possibility of using transmit beamforming as a MU MIMO transmission mechanism and a check if the stations 21 to 24 can be served simultaneously with MU MIMO transmission using the proposed beamforming vectors chosen by the transmitter. Overall, the proposed enhancement provides a better coordination of MU MIMO transmission and reduces possible interferences among the streams. Thus, it improves the performance of the overall network.

In a second embodiment, a new MU-DCF with a two-phase channel access procedure is presented. A MU MIMO transmission is performed with beamforming support for IEEE 802.11 based networks by using MAC frames, such as MU-CFR, MIMO channel feedback (M-CF), MU-RTS and M-CTS frames, for accessing a channel, and a MAC frame M-ACK for acknowledging the correctly received packets. Optionally, an adaptive MU MIMO transmission may be performed by modifying the beamforming vectors for the MU MIMO transmission of only a subset of stations that replied with M-CTS to build the next MIMO frame. The decision can be made based on the information gained from the M-CTS frame. If the channels are already known, the MU-CFR and M-CF frames may not be necessary for the channel access mechanism of MU MIMO transmission.

MU MIMO transmission increases the spectral efficiency and provides a better utilization of resources. However, in MIMO systems, providing high throughput to multiple stations simultaneously may become critical when the wireless network is dense.

Figure 5:
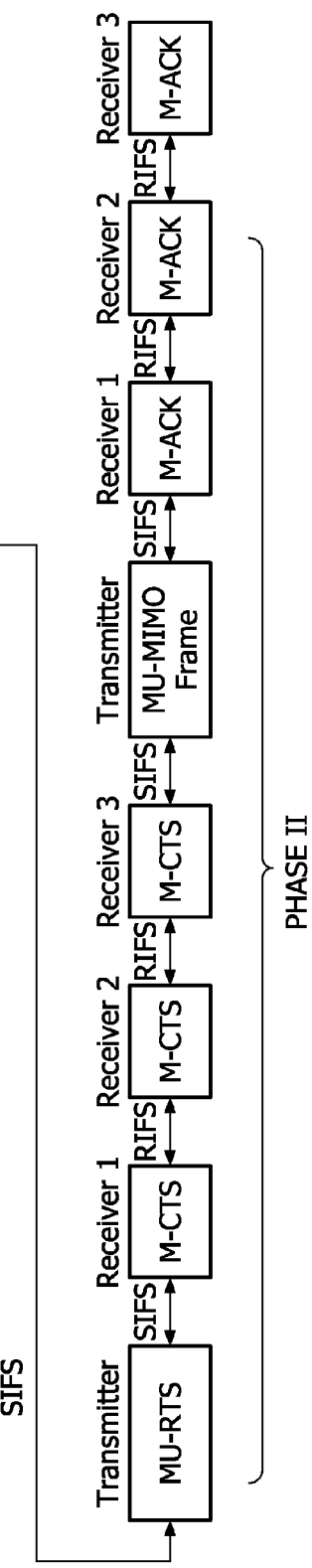
FIG. 5 shows a two-phase channel access procedure according to a second embodiment.

FIG. 5 shows the two-phase channel access procedure according to the second embodiment. The proposed MU-DCF procedure is based on a first phase of obtaining a channel state information from candidate stations/receivers, and a second phase of an MU-RTS and M-CTS exchange for channel access similar to the first embodiment.

In the first phase, the transmission is initiated by a multi-user channel state information feedback request (MU-CFR) frame in which the transmitter (e.g. AP 10 of FIG. 1) basically requests the channel state information from multiple receivers (e.g. subset of the stations 21 to 24 of FIG. 1).

FIG. 6 shows an MU-CFR frame structure according to the second embodiment, which can be followed by a training sequence for the channel estimation at the receiver. The proposed MU-CFR frame is a MAC frame with multiple receiver address fields.

After having received the MU-CFR frame, the stations which are present in the receiver list reply with a MIMO channel feedback (M-CF) frame. The M-CF frame is a MAC frame and may have the same frame format of a MIMO CSI feedback frame in SU MIMO systems according to IEEE 802.11n. The order of replies may be implicitly determined by the receivers' order in the list. The first M-CF frame is transmitted after the SIFS interval, and the following ones after respective RIFS intervals.

In the second phase, after the transmitter has sent an MU-CFR frame and has received the corresponding MIMO channel state information of each candidate receiver, it assesses the channel realizations of the stations for a possible MU MIMO transmission and determines an appropriate transmit beamforming vector for each station/spatial stream. Then, it proceeds with the channel reservation phase as in the first embodiment but with different MU-RTS and M-CTS frame formats.

FIG. 7 shows the proposed MU-RTS frame structure according to the second embodiment with a variable number of receiver addresses and which is enhanced by a variable number of additional Tx beamforming vectors.

There is however an alternative to this MU-RTS frame structure. The MU-RTS can be a generic MU-RTS without the Tx beamforming vectors. The training sequence which immediately follows the MU-RTS may be beamformed according to the TX beamforming vectors. The receivers then estimate the beamformed channel and feedback the CSI to the receiver. This information will serve the same purpose as the confirmed beamforming vectors fed back by the stations 21 to 24 to the AP 10. This approach is more advantageous because it reduces the amount of bits exchanged. However, the format of the feedback expected from each station must be communicated in the MU-RTS frame, so that not only the station can format the feedback, but also other stations can predict the duration of M-CTS frame sent by the station.

Figures 8, 9:
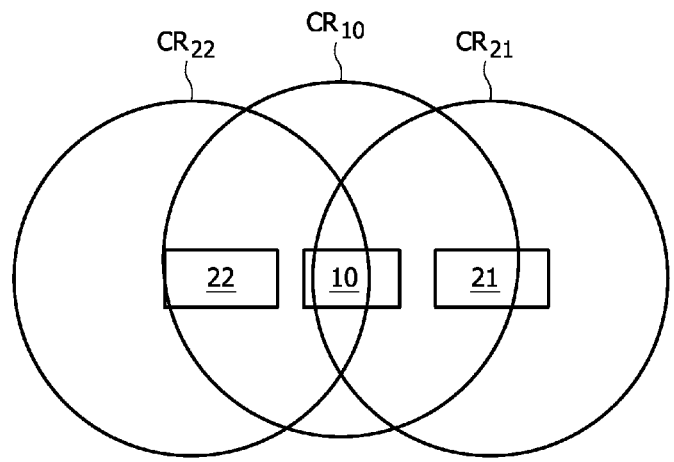
FIG. 8 shows an MU-CTS frame structure according to the second embodiment.
FIG. 9 shows a schematic illustration of the hidden node problem.

FIG. 8 shows the proposed new MU-CTS frame structure according to the second embodiment.

If the transmitter intends to send more than one spatial stream to a single station, it simply repeats the receiver address consecutively as many times as the number of spatial streams intended for that receiver. In this case, the proposed Tx beamforming vector for each spatial stream would be different as expected. In this way, the transmitter can easily change the mode from MU MIMO transmission to SU MIMO transmission.

The proposed new M-CTS frames according to the second embodiment contain a variable number of confirmed TX beamforming vectors, so that variable number of streams destined to the station can be assessed independently. This information can also be used at the transmitter for adaptively changing the beamforming vectors to better utilize the channel. Thus, with the above enhancements provided by the second embodiment, the transmitter can use transmit beamforming for reducing the interference among the spatial streams it sends.

The proposed protocol handshake procedures e.g. according to the above first and second embodiments may suffer from a so-called "hidden node problem". In the third embodiment, a modification to solve this hidden node problem is presented.

FIG. 9 illustrates this hidden node problem. It is assumed that the AP 10 of FIG. 1 with a communication range $CR_{10}$ would like to establish an MU MIMO transmission to the stations 21 and 22 with respective communication ranges $CR_{21}$ and $CR_{22}$ in a situation where the AP 10 is arranged between the stations 21 and 22. Because of the location of the stations 21 and 22, the first station 21 can listen to the transmission from AP 10 but not to the transmission from the second station 22. Similarly, the second station 22 can listen to the transmission from AP 10 but not to the transmission from the first station 21. This means that an M-CTS frame from the first station 21 cannot be received by the second station 22. If the second station 22 sensed an empty channel (i.e. there is no other transmission or interference), based on the algorithm explained in the first embodiment, the second station 22 will send an M-CTS frame after waiting for an SIFS plus an RIFS period. As a result, the M-CTS frame sent by the second station 22 will collide with the M-CTS frame sent by the first station 21 at the AP 10.

Because of the possibility that some stations polled for MU MIMO reception are not in each other communication range, it is proposed in the third embodiment that all stations polled for MU MIMO reception observe the end of the MU-RTS frame and calculate the duration they must wait before transmitting their M-CTS frames, taking into account the order of M-CTS transmission, the separation between each transmission, and the duration of each M-CTS transmission. A polled station then transmits its M-CTS frame after the determined duration (started from the time when the last transmission of an MU-RTS frame has been received by each station) has elapsed. While waiting to transmit the M-CTS frame, the concerned station does not need to sense the channel, because a correct reception of an MU-RTS frame implies a reserved channel between the station and the AP 10.

According to the third embodiment, the following improved procedure is proposed for setting up downlink MU MIMO transmission.

As in the first embodiment, the AP 10 initiates the MU MIMO transmission by transmitting an MU-RTS frame, which is a MAC frame including the multiple receiver addresses and which now also includes a duration field. The proposed duration field may contain a predicted duration d of the whole expected transmission, from the end of the MU-RTS frame up to the last M-ACK frame. If the number of receivers polled for MU MIMO reception is N, T(x) is the duration of x, where x is a data or control frame transmitted over the air, then the predicted duration d can be obtained as follows:

$$d=3*a\text{SIFStime}+N*T(\text{M-CTS})+T(\text{MU MIMO frame})+N*T(\text{M-ACK})+2*(N-1)*a\text{RIFStime} \quad (4)$$

where aSIFStime is the duration of SIFS and aSIFStime is the duration of RIFS. Furthermore, T(MU MIMO frame) is the estimated duration of the MU MIMO frame calculated by a scheduler of the MU MIMO transmitter. The operation of such a scheduler depends on each individual implementation.

The M-CTS frame has a fixed length. Furthermore, all M-CTS frames are transmitted using the same modulation and coding scheme. Therefore, the duration T(M-CTS) of the M-CTS frame is known to the AP 10. Similarly, the M-ACK frame has a fixed length, and is also required to be sent using the same modulation and coding scheme and hence, the duration T(M-ACK) of the M-ACK frame is also known to the AP 10.

By setting the proposed duration field, all stations which are not polled for the MU MIMO reception but which receive the MU-RTS frame can set their network allocation vector (NAV) according to the duration field in the MU-RTS frame, and will therefore not transmit during the reserved duration.

After receiving an MU-RTS frame, polled stations reply with an M-CTS frame, structured e.g. as proposed in the conventional M-DCF. The order of replies is determined by the receivers' order in the address list of the MU-RTS frame. The first M-CTS frame is transmitted after elapse of the duration aSIFStime and the following ones after elapse of the duration of the M-CTS frame plus aRIFStime. Because the transmission medium from the polled stations to the AP 10 is now reserved through the MU-RTS transmission, it is no longer necessary for the stations 21 to 24 to sense the medium before transmitting.

Furthermore, because of the possible hidden node problem, reception of a preceding M-CTS frame cannot be used to signal the transmission of another M-CTS. Therefore, it is proposed to control the M-CTS transmission as follows:

After receiving the MU-RTS frame, the position n of the concerned station in the receivers' order is determined and the time t the station must wait for before transmitting its M-CTS frame is calculated based on the following equation:

$$t=a\text{SIFStime}+(n-1)*(T(\text{M-CTS})+a\text{RIFStime}) \quad (5)$$

The duration field in the M-CTS can be obtained from the duration field of the MU-RTS frame subtracted by the value (t+T(M-CTS). The procedure at the AP 10 after transmission of the MU-RTS frame may correspond to the first embodiment. After receiving the MU MIMO frame, the stations may follow the same procedure in transmitting their M-ACK frames.

After having received a MU MIMO frame, the time t' the STA must wait for before transmitting its M-ACK frame can be calculated based on the following equation:

$$t'=a\text{SIFStime}+(n-1)*(T(\text{M-ACK})+a\text{RIFStime}) \quad (6)$$

The duration field in the M-ACK frame can thus be obtained from the duration field of the MU MIMO frame subtracted by the value (t'+T(M-ACK)).

The proposed mechanism may also be applied in the first phase of the two phase channel access in the MU MIMO case according to the second embodiment, namely to control the transmission of the M-CF frames by the polled stations.

Moreover, the proposed mechanism can be applied in the second phase of the two phase channel access in the MU MIMO case described in the second embodiment, namely to control the transmission of the M-CTS frames. It is noted that the duration of each M-CTS frame can be different from one to another because there may be multiple spatial streams intended for a single receiver. However, this information is provided in the MU-RTS frame, and therefore the AP 10 and all polled stations can take this into account in the calculation of the parameter t.

As explained above, the MU-RTS and M-CTS frame structures defined in the first and second embodiments require definition of new MAC frame formats.

In the present fourth embodiment, it is proposed to combine an aggregate MAC Protocol Data Unit (A-MPDU) and sounding feedback mechanisms in order to enable downlink MU MIMO transmission with minimum addition and alteration to the current specifications, such as IEEE 802.11n. This is advantageous because the proposed downlink MU MIMO is thereby compliant to earlier standard versions.

By using the proposed combination, only a MU-RTS frame has to be defined, while the M-CTS frame can be constructed by aggregating a conventional CTS frame and a sounding feedback frame. Furthermore, a more generic MU-RTS frame can be used with some extra information required in the MU-RTS carried in an additional frame aggregated to the MPDU.

The specification IEEE.802.11n defines an A-MPDU frame, where two or more MAC MPDUs or MAC frames can be transmitted in one transmit opportunity. To locate the MPDUs within the A-MPDU, a delimiter precedes an MPDU. Generally, this aggregation is meant for piggybacking an Action No Ack management frame (e.g. sounding feedback frame) into the data frame or control response frame transmission (e.g. CTS).

There are several sounding mechanisms defined in IEEE 802.11n, of which some have dedicated frames for feeding back sounding results. These frames can be a CSI frame, a non-compressed steering frame, a compressed steering frame, an antenna selection indices feedback frame. The CSI frame contains a channel state information for each subcarrier in each spatial stream and the SNR for each stream. The non-compressed steering frame contains the transmit steering matrix for each subcarrier in each spatial stream, as well as the SNR for each spatial stream. The compressed steering matrix contains a compressed format of the steering matrix. The antenna selection indices feedback frame contains an information about selected antennas for the next transmission for a receiver.

Using the proposed aggregate MPDU and the explicit feedback frames, the M-CTS frame proposed in the first embodiment can be redefined as an aggregation of a conventional CTS frame and an antenna selection indices feedback frame. The proposed antenna bitmap (PAB) field may be carried in the antenna selection indices feedback frame. The M-CTS frame proposed in the second preferred embodiment can be redefined as an aggregation of a conventional CTS frame and a compressed or non-compressed steering frame. The confirmed Tx beamforming vector fields may be carried in the steering frame. The MIMO control field in the steering frame can be set so that a parameter Nr designates the number of spatial streams intended for the CTS-sender, a parameter Nc designates the number of spatial streams (or the space time streams) the RTS-sender (e.g. the AP 10 in FIG. 1) will send (this information can be obtained from the number of receiver addresses, or the number of high throughput long training fields (HT-LTFs) set in the preamble of the packet), a parameter Nb, the number of bit used to represent a coefficient, is set to the same as the number of coefficients used by the AP 10 in the MU-RTS frame, so as the parameter Ng which designates the number of carriers grouped into one.

Because additional fields in MU-RTS proposed in the first and second embodiments are the same as the additional fields in the M-CTS frame, it is also proposed to redefine the MU-RTS frame as an aggregation of a more generic MU-RTS frame and an antenna selection indices feedback frame or a non-compressed steering feedback frame.

Figure 10:
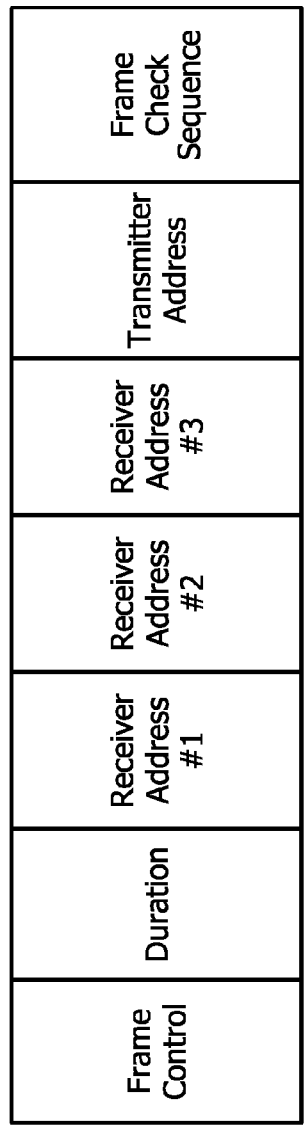
FIG. 10 shows a more generic MU-RTS frame structure according to a fourth embodiment.

FIG. 10 shows such a more generic MU-RTS frame structure according to the fourth embodiment. This generic MU-RTS frame can be used for other multi-user transmissions as well, e.g. multi-user OFDM transmission as initially mentioned.

Similar to the redefinition of the M-CTS frame, the additional fields can be carried in the antenna selection indices feedback frame or the steering frame. It is noted that the AP 10 may determine the format of the feedback through corresponding settings in the MIMO control field.

The MU-RTS frame as proposed in the first and second embodiments requires confirmations of transmit beamforming vectors or antenna bitmaps from the addressed stations. This means that the addressed stations must perform a channel measurement. Therefore, the AP 10 of FIG. 1 may send training sequences, for example the HT-LTFs in the preamble. The number of HT-LTFs to be sent must be equal or larger than the number of spatial streams (or space-time streams) that the AP 10 intends to send in the actual MU MIMO transmission.

It is further proposed in the fourth embodiment to use the MU-RTS/CTS message exchanges as a carrier for the sounding mechanism. This sounding mechanism carried by MU-RTS/CTS message can be used when the scheduler can process the channel state information (CSI) fed back in the M-CTS frame fast enough so that a MU MIMO frame can be scheduled at a timing aSIFStime after the reception of the last M-CTS. If this is not the case, the two phase approach can be used. It is noted that the interval between phase one and phase two has not been specified. hence, in the second phase, a confirmation of TX beamforming could be asked for, to make sure that the CSI in the AP 10 is not staled.

Instead of sending a MU-RTS frame with the proposed beamforming vectors or antenna bitmaps, the AP 10 may indicate to all addressed stations of the list to perform channel measurement by setting a "Not Sounding" bit in a HT_SIG- NAL field to "0". The combination of this bit and the MU-RTS frame may trigger the addressed station to perform channel measurement and to feed back the channel state information (CSI) in aggregation with the CTS frame. The format of the CSI frame sent by each station, namely the above Nb and Ng bits, may be the same for each station. These parameters can be set by the AP 10 and communicated through a high throughput control field (HTC) included in the MU-RTS frame through the usage of a control wrapper frame format, or specified to certain fixed values. If the format is communicated, new fields can be introduced in the HTC field which can take the current reserved fields, or the existing field can be redefined. The parameter Nc is determined by the number of spatial dimension the AP 10 would like to sound and it is evident from the number of HT-LTFs. Furthermore, the Nr value for each station can be communicated by the AP 10 so that each station can predict the duration of the aggregate CTS frame. These values can also be communicated via extra fields defined in HTC field.

In the following fifth embodiment, a MAC protocol enhancement is proposed that supports MU MIMO transmissions with beamforming in the uplink direction of MU transmission systems, such as IEEE 802.11 based WLANS. The fifth embodiment thus extends the first embodiment to uplink scenarios where a common receiver can serve multiple transmitters simultaneously. The fifth embodiment is based on a MAC mechanism where a common receiver (e.g. the AP 10 of FIG. 1) initiates a transmissions by broadcasting a call for transmissions (C4T) frame to candidate transmitters (e.g. the stations 21 to 23 of FIG. 1). The addressed candidate transmitters respond by sending M-RTS frames to show their intention to transmit to the common receiver with followed by training sequences for channel estimation at the receiver. As alternative, training sequences may be provided in respective preambles. The receiver estimates the channels from each transmitter and assesses the candidate transmitters according to their channel realizations. The receiver may also find appropriate transmit beamforming vectors for each transmitter and may reply to the M-RTS frames with an MU-CTS frame where it may indicate which transmitters can access the channel by using which transmit beamforming vectors. Then, the MU MIMO transmission can start.

The proposed new mechanism according to the fifth embodiment thus provides an uplink channel access mechanism for MU MIMO transmissions supporting transmit beamforming, where a common receiver supports simultaneous multiple packet reception from different transmitters. Thus, the spectral efficiency of the system can be increased. The embedded transmit beamforming mechanism provides a good MU MIMO transmission coordination among the multiple transmitters so that the interference among the spatial streams is minimized. Besides the new mechanism gives the possibility to switch between SU and MU MIMO transmission modes if the channel realizations are not appropriate for a MU MIMO transmission.

More specifically, in the proposed MU MIMO MAC mechanism for the uplink scenario C4T, M-RTS and MU-CTS frames may be used for accessing a channel, and a MU-ACK frame may be used for acknowledging correctly received packets. Optionally, an adaptive MU MIMO transmission may be provided by modifying transmit beamforming vectors for the MU MIMO transmission of only a subset of stations whose spatial streams are correctly received to build the next MIMO frame. The decision can be based on information gained from e.g. an error correction code (such as a cyclic redundancy code (CRC)) check of the received packets.

Figure 11:
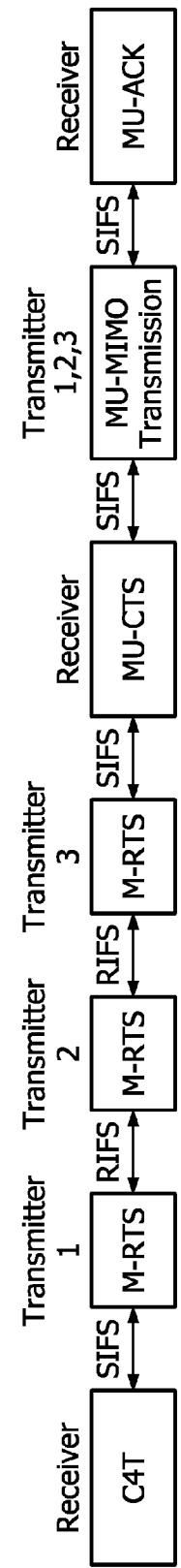
FIG. 11 shows a MU MIMO uplink mechanism according to a fifth embodiment.

In the following, the proposed MU MIMO uplink MAC procedure is described in more detail based on five steps as shown in FIG. 11.

In a first step, a common receiver (e.g. the AP 10 of FIG. 1) broadcasts a call for transmissions (C4T) frame to initiate a MU MIMO transmission in the uplink. In the C4T frame, it indicates the addresses of all uplink MU MIMO capable stations, which is a variable number. Alternatively, the AP 10 may decide to poll only a subset of uplink MU MIMO capable stations.

The C4T frame may also carry a request for sounding and an indication of the number of spatial dimensions to be sounded. Alternatively, the number of spatial dimensions to be sounded can be standardized to the channel estimation capability of the AP 10, which can be obtained from the HT capabilities field of the AP 10, which could be transmitted in beacon frames, association response frames, etc. The duration field may be set to cover the transmission duration up to the start of MU MIMO transmission. As explained above, this duration can be obtained from a summation of the duration of the responses from the stations, the duration of the MU-CTS frame and the SIFS/RIFS intervals separating the frames. Because the number of stations assigned for the MU MIMO transmission is not known when the C4T frame is constructed, the duration of MU-CTS frame is not known. For the calculation of the duration field of the C4T, the MU-CTS frame is assumed to contain the maximum number of fields and the MCS used is the same as the one used for the C4T frame transmission. It is noted that in the same frame, the format of the CSI report (e.g. parameters Nb, Ng, Nc, Nr) for each station must be conveyed. The mechanism to convey this information can be the same as used in the downlink MU MIMO transmission. The duration must also take into account the CSI reports. The C4T frame can be transmitted regularly. The frequency of recurrence may then depend on the number of uplink MU MIMO capable APs. The frequency may be communicated to other APs in a beacon frame.

FIG. 12 shows an example of a C4T frame structure with multiple transmitter address fields according to the fifth embodiment.

After each station has received the call, e.g. the C4T frame, they respond in the second step of the procedure by sending an M-RTS frame to indicate their intention to transmit to the indicated receiver. Here, "M-RTS frame" stands for M-DCF RTS frame and contains RTS frame fields and additional fields such as a CSI field. The M-RTS frame could be replaced by an aggregation of an RTS frame and a CSI feedback frame.

The order of M-RTS frames is implicitly determined by the transmitters' order in the list in the C4T frame. The first M-RTS frame is transmitted after an SIFS interval, and the following ones are transmitted after respective RIFS intervals. The physical protocol data unit (PPDU) carrying the M-RTS frame may be a sounding PPDU. The duration may be the summation of two durations, wherein the first duration starts at an SIFS interval after the completion of the M-RTS transmission up to the start of MU MIMO transmission and the second duration is the duration of the data frame transmission if the MCS used for the M-RTS frame would be used to transmit the pending data. From this duration field, the AP 10 can learn about the amount of data to be sent by a station and therefore it can set the duration field in the MU-CTS frame properly.

FIG. 13 shows an M-RTS frame structure as used in the fifth embodiment.

After the AP 10 receives the M-RTS frames from the candidate transmitting stations and estimates the channel realizations of the stations, it assesses in the third step of the procedure the channel realizations of the stations for a possible MU MIMO transmission and finds an appropriate transmit beamforming vector for each station or spatial stream. Next, it proceeds to the channel reservation by broadcasting an MU-CTS frame where it indicates which transmitters can access the channel by using which transmit beamforming vectors.

FIG. 14 shows an example of the proposed enhanced MU-CTS frame structure with Tx beamforming vectors according to the fifth embodiment.

Alternatively, a more generic MU-CTS frame could be used, which doesn't carry the Tx beamforming vectors. Then, an aggregated steering frame (compressed or non compressed) could be used to carry the Tx beamforming vectors. The MCS to be used in the transmission by the assigned stations may also be conveyed in these frames, e.g., in the HTC fields. The duration field may be set to the duration of the longest spatial stream plus an SIFS interval and the time needed to transmit the M-ACK frame.

In the fourth step of the procedure, the stations can access the channel by using the Tx beamforming vectors indicated in MU-CTS frame.

Finally, in the fifth step, after the MU MIMO uplink transmission is completed, the AP 10 may transmit an MU-ACK frame where it acknowledges successful receptions of packets transmitted simultaneously by the assigned stations.

FIG. 15 shows a corresponding MU-ACK frame structure according to the fifth embodiment. This acknowledgment can be conveyed in the acknowledged packet bitmap (APB) field whose length is equal to the number of Rx addresses in the MU-CTS frame. A successful reception of a packet can be acknowledged e.g. by setting the bit corresponding to the transmitting station to "1".

With the proposed mechanisms of the fifth embodiment, the receiver can initiate and coordinate the MU MIMO transmission in the uplink by finding the appropriate transmit beamforming vectors and feeding this information to the transmitters, thus, it provides an efficient channel access mechanism and an interference avoidance technique for MU MIMO uplink transmission.

In the sixth embodiment, a mechanism is proposed to reduce overhead in MU-DCF. Most of the overhead in MU-DCF is generated due to multiple M-CTS and M-ACK frame replies with their SIFS intervals and a preamble prior to each frame. Applying a multiple access scheme other then time division multiple access (TDMA) significantly improves the performance of the MU-DCF network.

In MIMO systems it is possible to spatially multiplex the frames, but channel knowledge at the transmitter cannot be assumed. In OFDM systems, such as IEEE 802.11a, the use of OFDMA transmissions leads to smallest hardware complexity. However, other schemes such as MC-CDMA or CDMA can have a similar effect.

In case of OFMDA, by using e.g. a quarter of sub-carriers, short packets such as the M-CTS and M-ACK frame, are not four times longer—since the major part of the frame is the preamble. Depending on the physical layer, M-CTS and M-ACK frames are several symbols longer. Assuming a packet size of 1024 byte, a physical layer mode for data packets of 54 Mb/s, a physical layer mode of 36 Mb/s (and other relevant parameters as in the IEEE 802.11a standard), the transmission window has a durations of 338 μs in the SU mode, 578 μs in the MU mode (TDMA), and 362 μs in the MU mode (OFDMA).

Thus, it is proposed in the sixth embodiment to reduce the time needed to transmit the M-CTS and M-ACK frames in MU mode of operation in MU-DCF. This reduces the overhead in the MU almost to that of a SU system, while preserving the above mentioned benefits of MU-MIMO transmissions.

Instead of transmitting the M-CTS and M-ACK frames in a TDMA mode, all the sub-carriers are divided into subsets and each subset is assigned to one station which has to send an M-CTS or M-ACK frame.

The information about the mapping of subcarrier subsets to stations can be determined from the order of the receivers in the address list conveyed in MU-RTS frame. Hence, M-CTS and M-ACK frames are transmitted simultaneously, so that the SIFS intervals and preambles which precede each frame in IEEE 802.11 networks and which are the carriers of the overhead in MU-MIMO systems are parallelized. Depending on the physical layer characteristics, the M-CTS and M-ACK frames may be only several symbols longer.

In summary, a transmitting apparatus, a receiving apparatus, a system and a method of performing multi-user transmission to a plurality of other transmission ends have been described, wherein a request for transmission, e.g. MU-RTS frame, MU-CFR frame, or C4T frame, is broadcast to the plurality of other transmission ends, and wherein the request is provided with a MAC frame which includes a list of at least two identifications of receiving ends which are requested to reply to the request. Various advantageous further enhancements and improvements of this underlying general concept have been provided in the above embodiments.

It is noted that the present invention is not restricted to the above embodiments and can be used for any multi-user transmission scheme, not only MU MIMO. More specifically, the invention is applicable to all types of MIMO based WLANs, particularly M-DCF systems. The protocol works in both single-user (SU) and MU mode. Performance improvements compared to M-DCF can be expected in highly interconnected systems and in AP downlink, where multiple connections are present. Moreover, the invention is applicable to all multi-user wireless systems with a random access MAC mechanism. It is expected to increase the spectral efficiency of the wireless networks where the traffic is asymmetric and most of the traffic originates from a single transmitter such as an AP in a downlink scenario or a server that distributes data to multiple stations, and/or where most of the traffic is destined to a single receiver such as an AP in an uplink scenario or a gateway that provides the access to external network.

Finally but yet importantly, it is noted that the term "comprises" or "comprising" when used in the specification including the claims is intended to specify the presence of stated features, means, steps or components, but does not exclude the presence or addition of one or more other features, means, steps, components or group thereof. Further, the word "a" or "an" preceding an element in a claim does not exclude the presence of a plurality of such elements. Moreover, any reference sign does not limit the scope of the claims.

The invention claimed is:

1. An apparatus for performing multi-user transmission to a plurality of other transmission ends, said apparatus being configured:

to broadcast a request for transmission to said plurality of other transmission ends;

to provide said request with a Medium Access Control (MAC) frame which includes a list of at least two identifications of other transmission ends which are requested to reply to said request; and to use said request for transmission as a request for feeding back a channel state information, to assess channel realizations of said other transmission ends based on channel state feedback information received from said other transmission ends, and to derive appropriate beamforming vectors for said other transmission ends, wherein an order of the identifications in the list is used by the other transmission ends to derive a timing corresponding to said order for a response to said request.

2. The apparatus according to claim 1, wherein said apparatus is configured to create a transmission frame only from packets destined to at least one of those other transmission ends which replied to said request for transmission.

3. The apparatus according to claim 2, wherein said identification comprises a MAC address.

4. The apparatus according to claim 1, wherein said other transmission ends are candidate transmitters which are addressed to return a sending request to show their intention to transmit.

5. The apparatus according to claim 4, wherein said apparatus is configured to perform channel estimation for said candidate transmitters according to their channel realizations, and to reply to said sending request with a sending confirmation indicating which transmitter can access a channel by which beamforming vector.

6. The apparatus according to claim 1, wherein said apparatus comprises a multi-user transceiver with at least one of a multiple input chain and a multiple output chain.

7. The apparatus according to claim 1, wherein said request for transmission comprises information which specifies a format to be used for said requested channel state feedback information.

8. The apparatus according to claim 1, wherein said apparatus is configured to acknowledge receipt of transmissions by sending a MAC frame which indicates those other transmission ends from which said transmissions have been received.

9. The apparatus according to claim 8, wherein said apparatus is configured to indicate said other transmission ends from which said transmissions have been received, by setting a respective bit in a bitmap provided in said MAC frame.

10. The apparatus according to claim 1, wherein said apparatus is configured to broadcast sending request frames including a list of said other transmission ends and said appropriate beamforming vectors for said other transmission ends.

11. The apparatus according to claim 1, wherein said apparatus is configured to add to said request for transmission a duration information which indicates a predicted duration of a whole expected transmission.

12. The apparatus according to claim 1, wherein said apparatus comprises a multi-user transceiver with at least one of multiple input chain and a multiple output chain.

13. An apparatus for receiving a multi-user transmission signal, said apparatus being configured:
to receive a request for transmission;
to detect a list of at least two receiver identifications in a Medium Access Control MAC frame provided by said request for transmission;
to respond to said request for transmission if said list contains an identification of said apparatus;
to respond to said request for transmission with a channel feedback frame including a channel state information and appropriate transmit beamforming vectors; and
based on an order of said identification in said list, to derive a timing corresponding to said order for its response.

14. The apparatus according to claim 13, wherein said apparatus is configured to include in the response a duration information indicating an amount of data in its transmission queue.

15. The apparatus according to claim 13, wherein said apparatus is configured to set its network allocation vector in accordance with a content of a duration field provided in said request for transmission, if said list does not contain any identification of said apparatus.

16. The apparatus according to claim 13, wherein said apparatus is configured to calculate a waiting time for its response by using a duration field provided in said request for transmission.

17. The apparatus according to claim 13, wherein said apparatus is configured to respond by combining an aggregate MAC packet data unit and a sounding feedback mechanism including a frame with information for channel access determination including determining which transmitter of the plurality of other transmission ends can access a channel by which beamforming vector of the derived beamforming vectors.

18. The apparatus according to claim 13, wherein said apparatus is configured to use an assigned subset of subcarriers of a multi-user transmission signal for the response.

19. The apparatus according to claim 18, wherein said apparatus is configured to derive said assigned subset from the order of said identification in said list.

20. The apparatus according to claim 18, wherein said apparatus is configured to respond a predetermined time period after the reception of said request.

21. A method for performing multi-user transmission between a first transmission end and a plurality of second transmission ends, said method comprising the acts of:
incorporating into a Medium Access Control MAC frame a list of at least two identifications of receiving ends which are requested to respond to said multi-user transmission;
broadcasting said MAC frame including said list, in a request for transmission to said plurality of second transmission ends; and
using said request for transmission as a request for feeding back a channel state information, to assess channel realizations of said other transmission ends based on channel state feedback information received from said plurality of second transmission ends, and to derive appropriate beamforming vectors for said plurality of second transmission end,
wherein an order of the identifications in the list is used by the receiving ends to derive a timing corresponding to said order for a response to said request.

22. A system for multi-user transmission comprising at least one transmitting apparatus for performing multi-user transmission to a plurality of other transmission ends, said at least one transmitting apparatus being configured:
to broadcast a request for transmission to said plurality of other transmission ends; and to provide said request with a Medium Access Control MAC frame which includes a list of at least two identifications of other transmission ends which are requested to reply to said request and a further apparatus according to claim 13.

23. The system according to claim 22, wherein said at least one transmitting apparatus and said further apparatus are at least a part of a wireless local area network.

24. A non-transitory computer readable medium embodying computer instructions which, when executed by a processor, configure the processor to perform the method of claim 21.

* * * * *